(12) United States Patent
Shaw et al.

(10) Patent No.: US 10,445,407 B2
(45) Date of Patent: Oct. 15, 2019

(54) AUTOMATED GENERATION OF GUIDES BASED ON CONTENT ZONE SHAPES

(71) Applicant: ADOBE INC., San Jose, CA (US)

(72) Inventors: Seth Alan Shaw, San Francisco, CA (US); Alan Lee Erickson, Highlands Ranch, CO (US)

(73) Assignee: Adobe Inc., San Jose, CA (US)

( * ) Notice: Subject to any disclaimer, the term of this patent is extended or adjusted under 35 U.S.C. 154(b) by 19 days.

(21) Appl. No.: 14/804,139

(22) Filed: Jul. 20, 2015

(65) Prior Publication Data

US 2017/0024361 A1 Jan. 26, 2017

(51) Int. Cl.
*G06F 17/20* (2006.01)
*G06F 17/21* (2006.01)
*G06F 3/0484* (2013.01)
*G06T 11/60* (2006.01)

(52) U.S. Cl.
CPC ........ *G06F 17/212* (2013.01); *G06F 3/04842* (2013.01); *G06T 11/60* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 2004/0030997 A1* | 2/2004 | Farrah | ............ | G06T 11/60 715/255 |
| 2005/0183009 A1* | 8/2005 | Hannebauer | ............ | G06F 17/24 715/244 |
| 2006/0136807 A1* | 6/2006 | Yalovsky | ............ | G06F 17/245 715/209 |
| 2011/0074710 A1* | 3/2011 | Weeldreyer | ............ | G06F 3/0481 345/173 |
| 2015/0339267 A1* | 11/2015 | Janas | ............ | G06F 17/211 715/202 |

* cited by examiner

*Primary Examiner* — Keith D Bloomquist
(74) *Attorney, Agent, or Firm* — Shook, Hardy & Bacon, L.L.P.

(57) ABSTRACT

In various embodiments, methods and systems, for automatically generating guides, are provided. A user can generate guides based on content zones of a wireframe layout or visual element layout. A selection of a content zone having a shape is received. A selection of a guide creation action to generate a grid structure encompassing the shape of the content zone is received. A determination of a boundary set for the shape is made. The boundary set includes a top boundary, a bottom boundary, a left boundary, and a right boundary. The boundary set is based on a data (e.g., vector, pixel, text) perimeter of the shape. The grid structure is automatically generated based on the shape. The grid structure comprises a top horizontal guide, a bottom horizontal guide, a left vertical guide, and right vertical guide. The grid structure is located adjacent to portions of the boundary set of the shape.

20 Claims, 10 Drawing Sheets

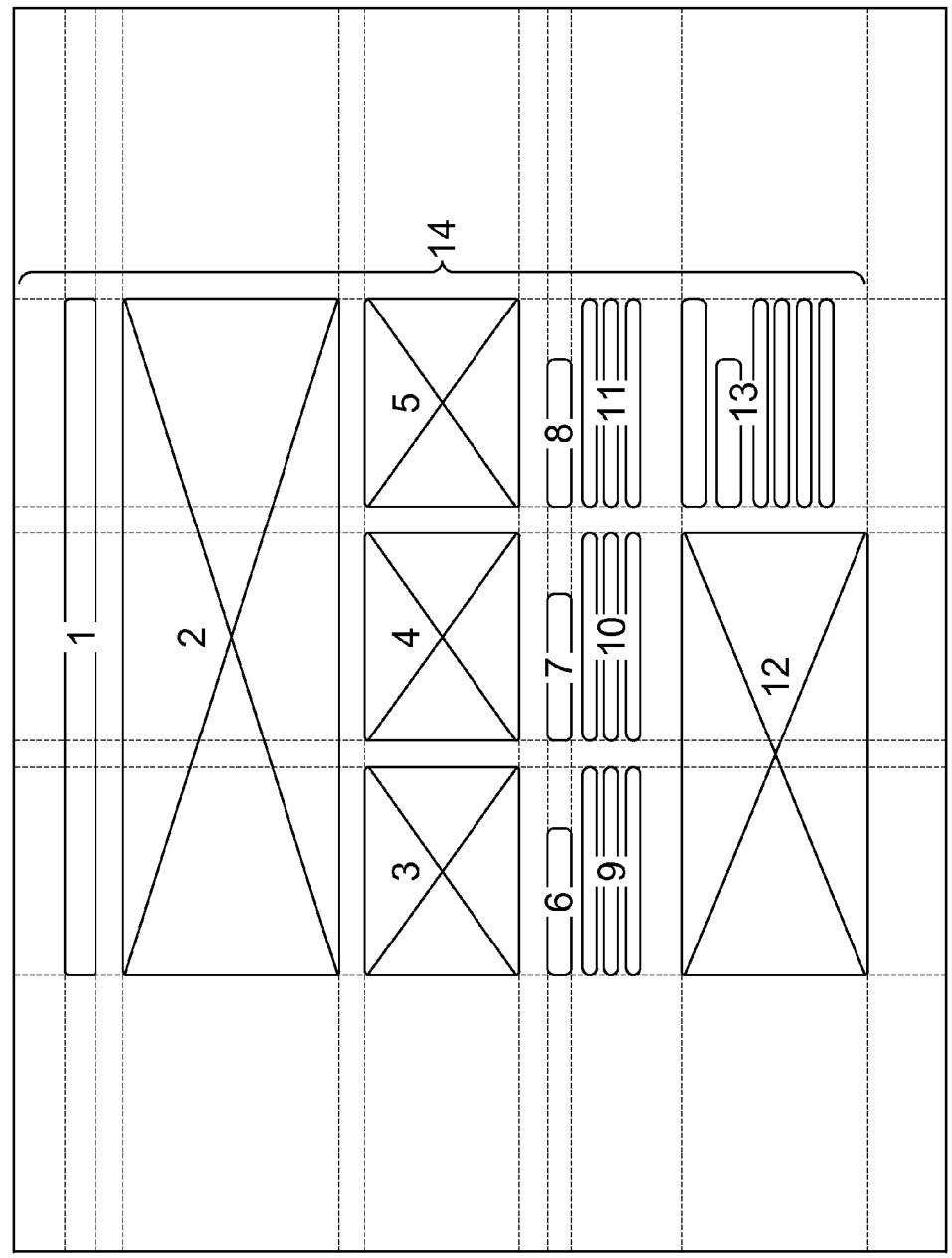

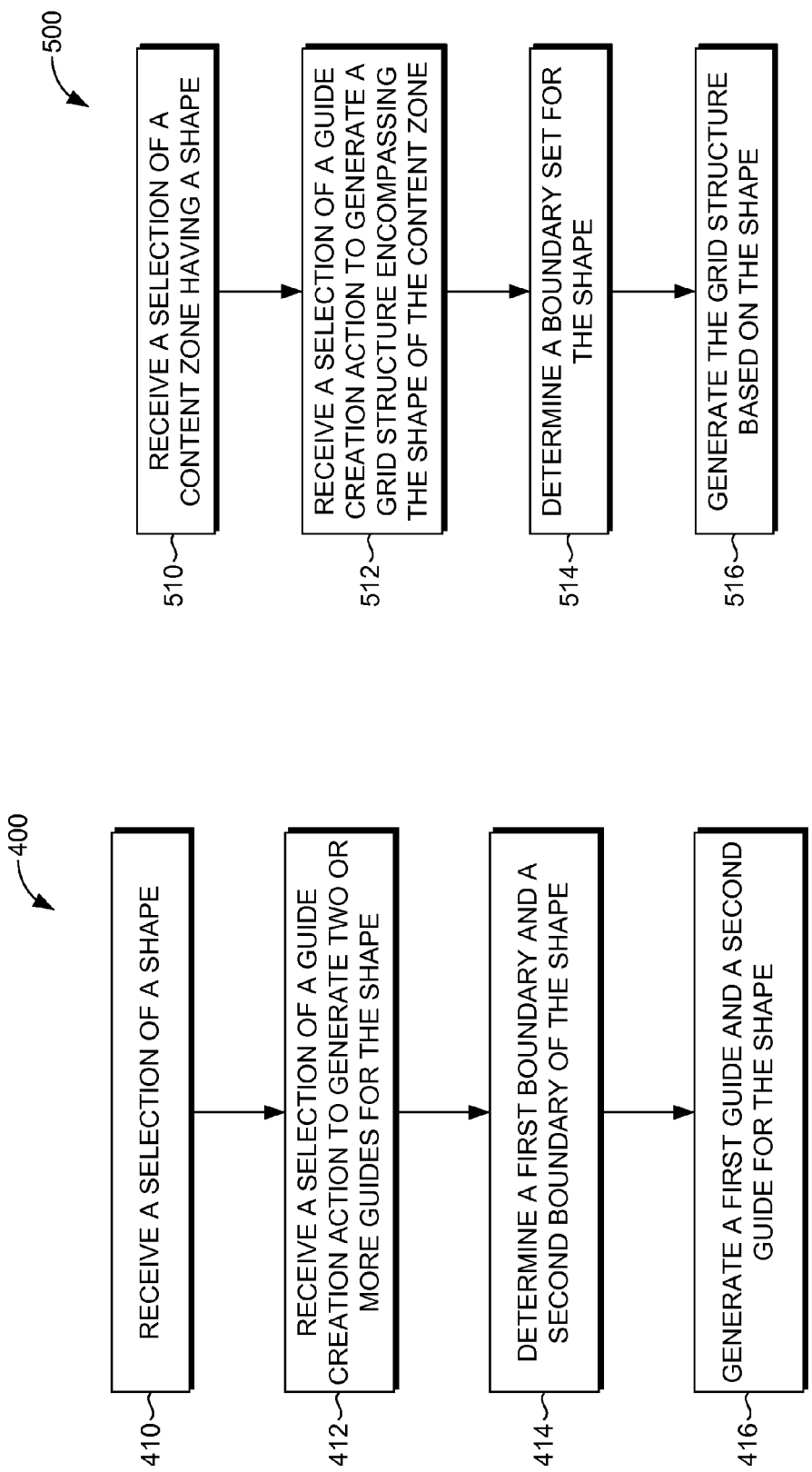

AUTOMATED GENERATION OF GUIDES BASED ON CONTENT ZONE SHAPES

BACKGROUND

Guides are a feature of graphic design that facilitate aligning visual elements (e.g., text or graphic) in a design document. In particular, guides can be used to align visual elements horizontally and/or vertically, independently or in combination with other visual elements within a design document. By way of example only, assume that a designer is creating a web design that includes multiple visual elements; the designer can include individual guides on the design document canvas to align different visual elements of a design document. Typically, to align visual elements, the designer manually moves or drags individual guides, one at a time, adjacent to particular visual elements, and aligns a first visual element along one or more guides. The one or more manually placed guides can also be used to align a second visual element along the one or more guides and, as a result, aligns the two visual elements relative to one another.

Designers can also specifically use four individually placed guides around a primary visual element to align additional visual elements in a graphical design. For example, a designer can drag individual guides adjacent to a visual element, per side of the visual element. As such, for the visual element, a user would drag four guides to each side of the visual element to create a grid of guides, where the grid can be a relative position used to align multiple visual elements. This process of placing guides can at times require zooming into the design document canvas to properly lock each individual guide to each side of the visual element. Even with a snapping feature for guides, where the snapping feature in a design document snaps a guide to a particular visual element, generating guides still requires human-assisted intervention to define guides around a visual element.

A guide can also be positioned in a specific location on a design document based on a ruler of the design document. The ruler, which appears horizontally and/or vertically on the design document stage, has measurement markings (e.g., inches or centimeters) which are used to place individual guides on measured positions on the design document canvas. In this regard, various guides can be manually manipulated by the designer to place the guides in locations of the design document canvas to help align visual elements. Defining guides manually, and also just one guide at a time, can be tedious and time consuming.

SUMMARY

Embodiments described herein provide methods and systems for automatically generating guides. In this regard, guides can be automatically generated in accordance with a shape within a design document to facilitate aligning visual elements in the design document. At a high level, guides can be automatically generated based on a received selection of a shape or a content zone in a design document. As described herein, a selection of one or more shapes or content zones can be received. A selection of a guide creation action, such as a keyboard or a selectable input of a design document interface, can then be received to trigger creating the at least two guides based on the shape(s) or content zone(s). As such, advantageously, with one simple action or command a set of guides can be automatically and concurrently (or nearly concurrently) generated for the shape(s) or content zone(s). The guide creation feature can automatically, quickly, efficiently, and without user intervention generate guides which would otherwise be manually and inefficiently generated with conventional tools. Further, the automatic generation of guides based on a selected shape, for example, a shape that represents a content zone, can be performed in near simultaneous manner improving the efficiency of creating guides which would otherwise be generated independently of one another.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 2A-2E are schematics of exemplary automatically generated guides for content zones, in accordance with embodiments described herein;

FIG. 4 is a flow diagram showing an exemplary method for automatically generating guides, in accordance with embodiments described herein;

FIG. 5 is a flow diagram showing an exemplary method for automatically generating guides, in accordance with embodiments described herein;

DETAILED DESCRIPTION

Figure 1A:
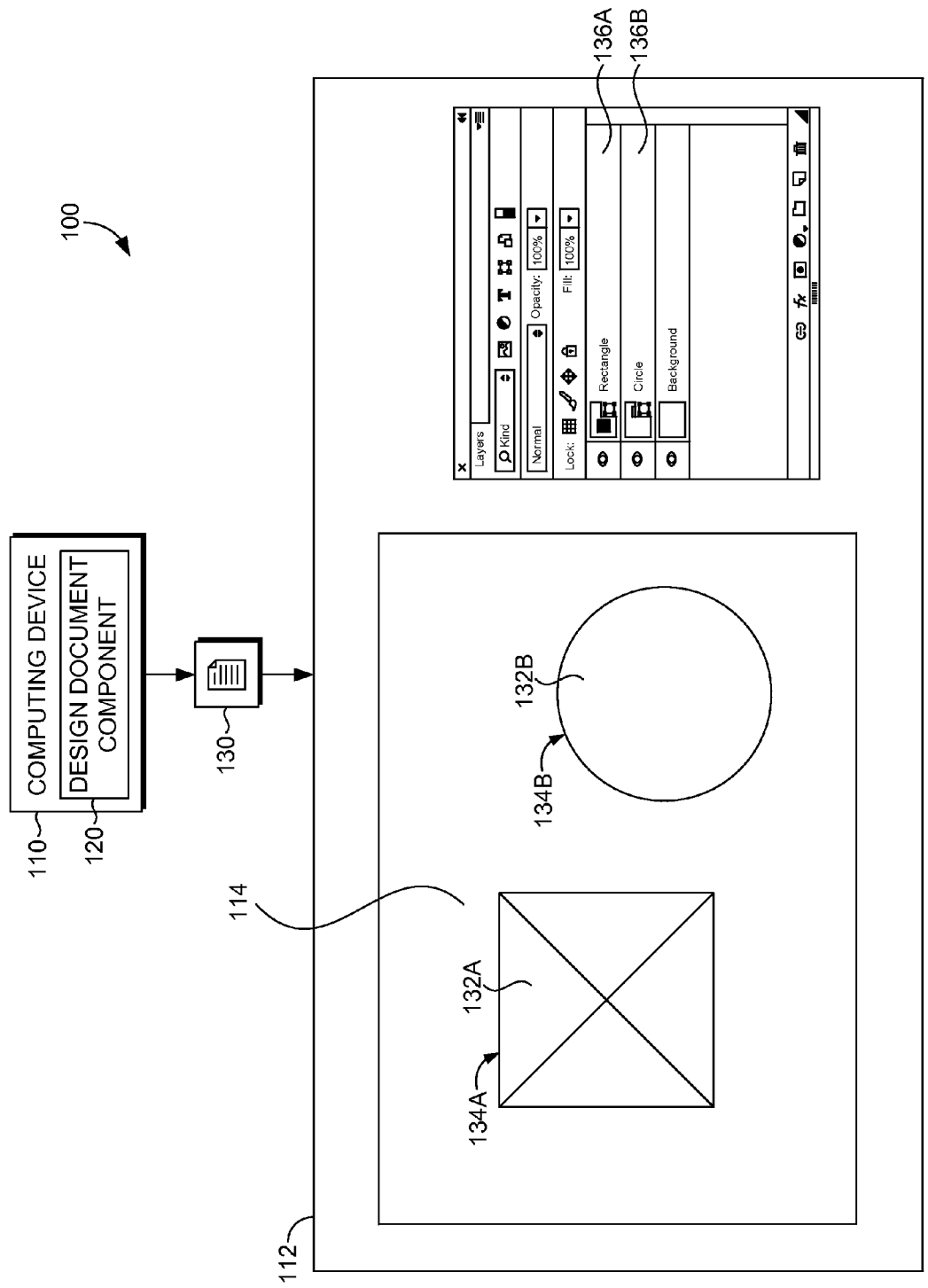
FIGS. 1A-1E are block diagrams of an exemplary document design system, in which embodiments described herein may be employed.

Digital designers can include guides on a design document to help arrange visual elements (e.g., text or graphic) on a design document canvas. Guides can be used to align visual elements horizontally and/or vertically, independently or in combination with other visual elements within a design document. Typically, to align visual elements, the designer manually moves or drags individual guides, one at a time, adjacent to particular visual elements, and aligns one or more visual element along one or more guides. Various guides can be manually manipulated by the designer to place the guides in locations of the design document canvas to help align visual elements. Defining guides manually, and also just one guide at a time, can be tedious and time consuming.

Embodiments of the present invention provide simple and efficient methods and systems for automating the generation of guides based on an automated guide creation feature. In particular, guides are generated based on shapes or content zones in a wireframe layout or a visual element layout. Content zones can be defined in wireframe layouts and visual element layouts where a layout can generally refer to an arrangement of content. A content zone refers to an area or region in which content (e.g., visual elements) can be placed or positioned. A content zone can include data (e.g., vector, pixel, or text) that help define the shape of the content zone or a selectable shape corresponding to the content zone. A content zone can also refer to visual elements (e.g., text or graphic) in a visual element layout. As used herein, a visual element layout can refer to a wireframe layout which has been populated with visual elements. Digital designers can develop wireframe layouts to help preview the arrangement of visual elements (e.g., text or graphic), where a wireframe represents a skeletal frame for the purpose of arranging visual elements. Shapes or content zones can be used to generate guides that facilitate aligning visual elements in the content zones. For example, a guide can be placed adjacent to a shape or content zone so that visual elements are aligned with the shape or content zone. A guide in a design document can be vertical or horizontal such that visual elements are aligned horizontally and vertically, and also independently or in combination with other visual elements of a design document.

At a high level, a selection of one or more shapes or content zones can be received. A selection of a guide creation action, such as a keyboard or a selectable input of design document interface, can then be received to trigger creating guides based on the one or more shapes or content zones. Specifically, a grid structure of guides encompassing a shape of a content zone can be generated. A grid structure any number of forms, such as, a top horizontal guide, a bottom horizontal guide, a left vertical guide, and a right vertical guide. In a wireframe layout or visual element layout having multiple shapes or content zones, a plurality of grid structures can be generated for only selected shapes or content zones, while bypassing unselected shapes or content zones. In some embodiments, the grid structure is generated on a design document canvas of a design document that supports the wireframe layout or the visual element layout. As such, one simple action or command in a design document generates a set of guides for one or more shapes or content zones. By way of example, instead of receiving selections of individual guides and aligning the guides adjacent to shapes or content zones, per side of the shapes or content zone based on manual user input, embodiments described herein automatically generate a grid structure around one or more selected shapes or content zones based on determining a boundary set of a selected shape or a shape of the content zone. The terms content zone and shapes can be used interchangeably, where, in a design document, a shape or content zone having a shape can be selected in a design document to perform functionality described.

A content zone has a shape (e.g., circle, square, or other irregular shape). The shape is defined based on data (e.g., vector data, pixel data, and text data) of the content zone. In this regard, a shape can be a determined perimeter of data in a content zone. It is also contemplated that a shape can be a selection of a portion of a design document, where the shape used in generating guides. The shape can be regular (e.g., circle, rectangle, square) with symmetry or irregular without symmetry. By way of example, a content zone can have a square shape where the data perimeter of the content zone defines a square, a content zone can have a circular shape, where the perimeter of data in the content zone defines a circle, and a content zone can have an irregular shape where the perimeter of data in the content zone defines an irregular shape.

A shape of a content zone can facilitate defining a boundary set of the shape. A boundary is a defined surrounding limit of content zone that is used to generate guides. A boundary can be defined based on a terminal portion of a shape. It is contemplated that boundary can be immediately adjacent to the terminal portion of the shape, and alternatively, the boundary can be defined with a buffer zone between the terminal portion of the shape and the boundary. A boundary set includes a top, bottom, left, and right boundary corresponding to terminal portions identified for a shape of the content zone. By way of example, a content zone having a square shape can have a top terminal portion, bottom terminal portion, right terminal portion and left terminal portion that are identified to define the boundary set of the shape.

The grid structure can be generated based on a boundary set of the shape. Basically, the grid structure includes a top horizontal guide, a bottom horizontal guide, a left vertical guide, and a right vertical guide corresponding to a boundary set of shape. A guide can refer to a design device, mark, line, or other indicia that can be used to regulate placement or progressive action. A guide can specifically refer to a line in a design document that supports alignment of visual elements, either passively, by showing visual alignment, or actively by causing visual element to snap to alignment when creating or moving the content. For example, a guide that is a straight single line on a design document can extend from at least a first edge to a second edge of the design document canvas. The line can be horizontal or vertical. Other variations and combination of guides are contemplated with embodiments of described herein.

With the automated generation of guides, a user can advantageously use the guides to align visual elements horizontally and/or vertically, independently or in combination with other visual elements within a design document. An indication can be received to align a first visual element (e.g., text) along a guide. Another indication can also be received to align a second visual element (e.g., graphic) along the guide and, as a result, the two visual elements are aligned relative to one another.

Referring now to FIGS. 1A-1E, the block diagrams illustrate features of an exemplary design document system 100 in which embodiments of the present disclosure may be employed. In particular, FIG. 1A shows a high level architecture of a design document system 100 having a design document component 120 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With initial reference to FIG. 1A, FIG. 1A illustrates a design document system 100 having a computing device 110 operably coupled to a display component 112, a design document component 120, and design document 130. The design document component 120 can be implemented on the computing device 110, for example, a computing device as described in FIG. 7 herein. At a high level, the design document component 120 can automatically generate guides on design documents. The design document system 100 can include a processor and a memory (both not shown) configured for providing instructions to the processor to facilitate performing operations of the design document component 120.

In operation, the design document component 120 can be responsible for performing processing of inputs and selections, identification of a shape of a content zone and a corresponding boundary set, and automatically generating guides based on the boundary set. In this regard, the design document component can receive a selection of a content zone (e.g., 132A and 132B) or a shape displayed using the display component 112 on a design document canvas 114. The content zones or shapes can be defined in a wireframe layout of visual element layout. A content zone or a shape can be selected based on a, click, touch, keyboard keys or other selection input of design document interface. A content zone or shape can specifically be associated with a layer (e.g., layer 136A and 136B) of the design document 130 supported using the design document component 120. A layer in a design document generally allows for performing actions on objects of a layer independently of objects on other layers. The design document component 120 can associate a selected content zone or shape with indicia denoting the content zone or shape as a selected content zone or shape. Indicia can include a graphic element that highlights a content zone or shape as a selected content zone or shape. It is contemplated that a subset of content zones or shapes can be selected from a plurality of content zones or shapes, as such additional processing for generating guides can be performed only on the subset of content zones.

The design document component 120 can provide one or more interface inputs for receiving an indication to generate guides. The indication to generate guides can be a selectable dropdown menu item, a keyboard shortcut key, or other designated interface input in the design document. The design document component 120 can receive a selection of a guide creation action to generate a grid structure for selected content zones. Upon receiving the indication to generate guides, the design document component 120 can determine a boundary set for the shape of the content zone. As discussed, a content zone comprises a shape (e.g., 134A and 134B). The design document component 120 can identify a shape based on a perimeter of data (e.g., vector data, pixel data, text data) in a content zone. It is also contemplated that a shape can be a selection of a portion of a design document, where the shape used in generating guides. The document design component 120 can also identify terminal portions of the shape to facilitate defining a boundary set. The terminal portions of a shape can be determined in different ways. For example, the terminal portions of the shape can be the tightest opaque boundary (e.g., a non-transparent boundary) of the shape top, bottom, left, and right. In another example, a feathered object can have semi-transparent data at the edges of the feathered object, as such, a policy is implemented to use terminal portions having an identified point of transparency (e.g., 50% transparency) as the terminal portions of a shape of a feathered object.

Using the shape the design document component 120 can define a boundary set of the shape. A boundary can be defined based on a terminal portion of a shape. In one exemplary embodiment, the boundary is immediately adjacent to the terminal portion of the shape. In another embodiment, the boundary can be defined with a buffer zone between one or more terminal portions of the shape and the boundary. A boundary set includes a top, bottom, left, and right boundary based on corresponding terminal portions identified for a shape of the content zone. The design document component 120 can also programmatically define a boundary of a shape of a content zone. The shape of the content zone is basically associated with a programmatically defined top, bottom, left, and right boundary set.

The design document component 120 is responsible for, without user intervention, generating guides based on a boundary set of a shape. In one embodiment, the guides are generated as a grid structure based on a boundary set of a shape. The design document component 120 can simultaneously or sequentially generate individual guides (e.g., a top horizontal guide, a bottom horizontal guide, a left vertical guide, and a right vertical guide) corresponding to the boundary set. The design document component 120 can generate guides for each selected content zone. The guides can be generated on a design document canvas, such that, the guides extend from at least a first edge to a second edge of the design document canvas. The guides can be horizontal or vertical.

The design document component 120 generates guides automatically layer by layer and content zone by content zone. As such, it is possible that a first content zone on a first layer can trigger generating a guide that is also a guide for a second content zone on the same layer or another layer. As such, the design document component 120 can bypass generating an additional guide for a second content zone if the guide has already been generated for a first content zone. In this regard, the design document component avoids generating multiple overlapping guides for the content zones.

Figure 1B:
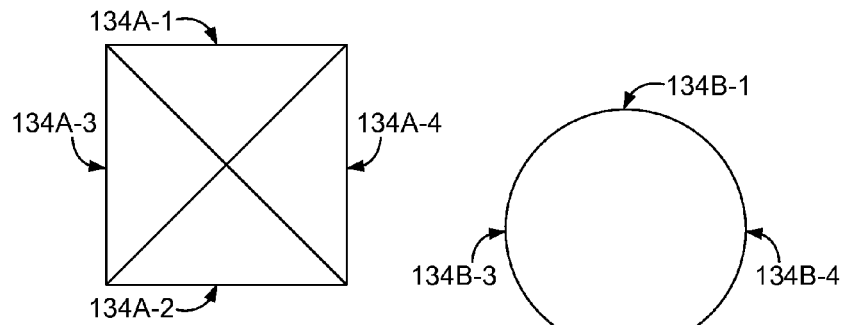
Figure 1C:
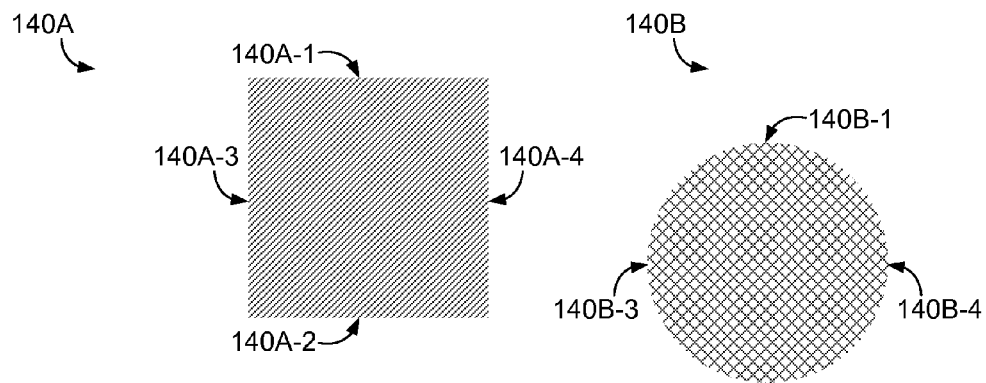

Turning to FIGS. 1B and 1C, the design document component 120 can determine a boundary set (e.g., 140A and 140B). A boundary set can be defined for a shape of a content zone, in particular, the boundary can be based on a top portion of the shape 134A-1, a bottom portion of the shape 134A-2, a left portion of the shape 134A-3, and a right portion of the shape 134A-4 corresponding to a boundary top portion 140A-1, bottom portion 140A-2, left portion 140A-3, and right portion 140A-4. Also, another boundary set depicted includes the boundary based on a top portion of the shape 134B-1, a bottom portion of the shape 134B-2, a left portion of the shape 134B-3, and a right portion of the shape 134B-4 corresponding to a boundary top portion 140B-1, bottom portion 140B-2, left portion 140B-3, and right portion 140B-4. The selected shape can be defined based on content zone data (e.g., vector data, pixel data, or text data). In embodiments, the design document component 120 can combine two or more content zones into a new content zone and determine a boundary set for the new content zone such that guides are generated for the new content zone.

Figure 1D:
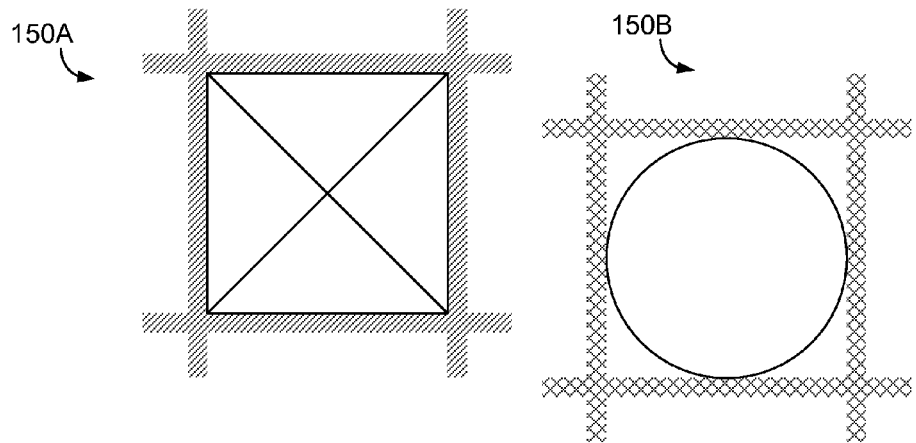

Turning to FIG. 1D, the design document component 120 can further be responsible for generating guides for content zones. Generating guides can be based on receiving a user selection through an input interface to trigger automatically generating the guides (e.g., a grid structure) of on the selected content zones. Upon receiving the user selection (e.g., a dropdown menu selection or keyboard shortcut) it is contemplated that guides may be generated without additional user intervention. As discussed in more detail below, guides (e.g., guide 150A and 150B) can be generated for a selected content zone such that a grid structure encompasses the shape of the selected content zone based on a boundary set for of the shape Each guide that is generated can be located adjacent to a boundary from the boundary set. Adjacent to a boundary may include portions directly next to the boundary of a shape of the content zone. In particular, the guide can be generated to stroke an outside portion of the boundary or in the alternative the guide can be generated to overlay an opaque portion of the shape that defines the boundary. Other variations and combinations for generating guides based on the boundary set are contemplated with embodiments described herein.

Figure 1E:
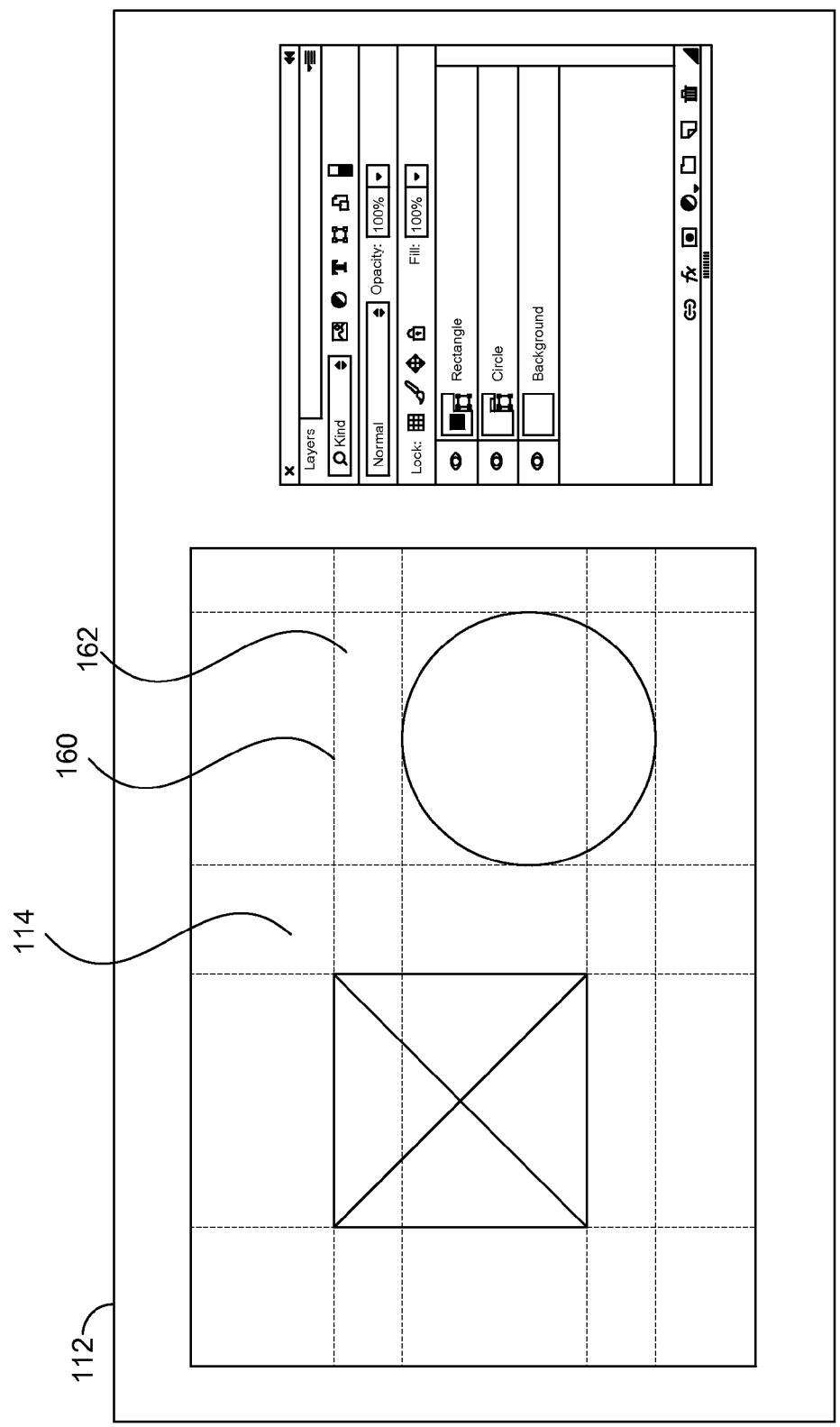

With reference to FIG. 1E, the display component can display the generated guides (e.g., 150A and 150B) on the design document canvas 114. The content zones 132A and 132B are not aligned, as such, no overlapping occurs with the guides. However, in embodiments where the content zones 132A and 132B are aligned, the design document component can first determine whether at least one guide to be generated for a second content zone will overlap an existing guide of a first content zone. As such, generating guides for the content zones 132A and 132B further comprises determining that at least one guide is bypassed from generation based on the at least one guide overlapping an existing guide.

Figure 2A:
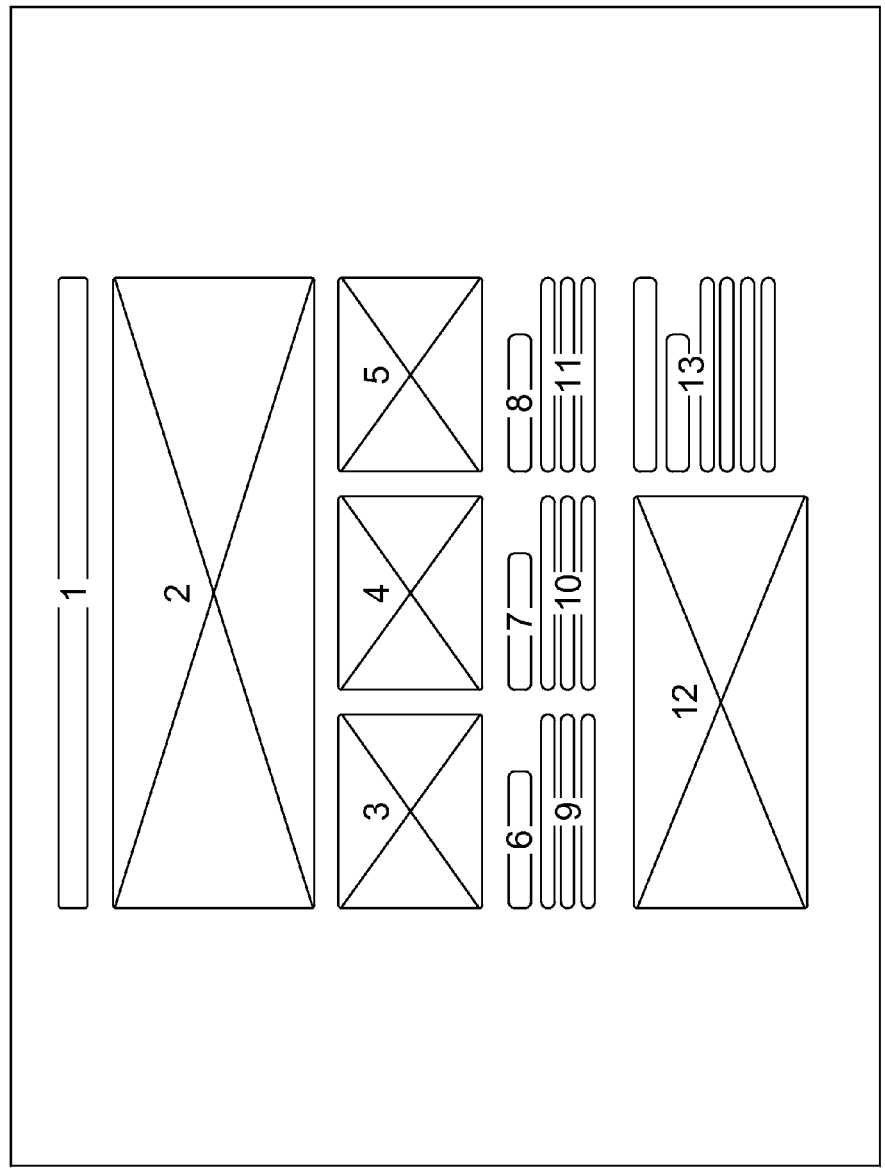

With reference to FIGS. 2A-2E, exemplary schematics of automatically generated guides for embodiments described herein are provided. FIGS. 2A and 2B illustrate a wireframe layout 200. FIG. 2A includes a wireframe layout without guides and FIG. 2B includes a wireframe layout with guides generated based on embodiments described herein. A wireframe layout can be used by graphic designers to facilitate previewing the presentation of content that can be incorporated into content contexts. The wireframes can be used as a starting point for selecting content zones for generating guides. In the alternative or in addition to wireframe layouts, visual element layouts can be used as a starting point for selecting content zones for generating guides. The wireframe layout or visual element layout can include content zones on one or more layers. Upon receiving a selection of one or more content zones, guides can be generated. For example, guides can be automatically generated for each of the 13 content zones, when each of the 13 zones is selected.

Figure 2C:
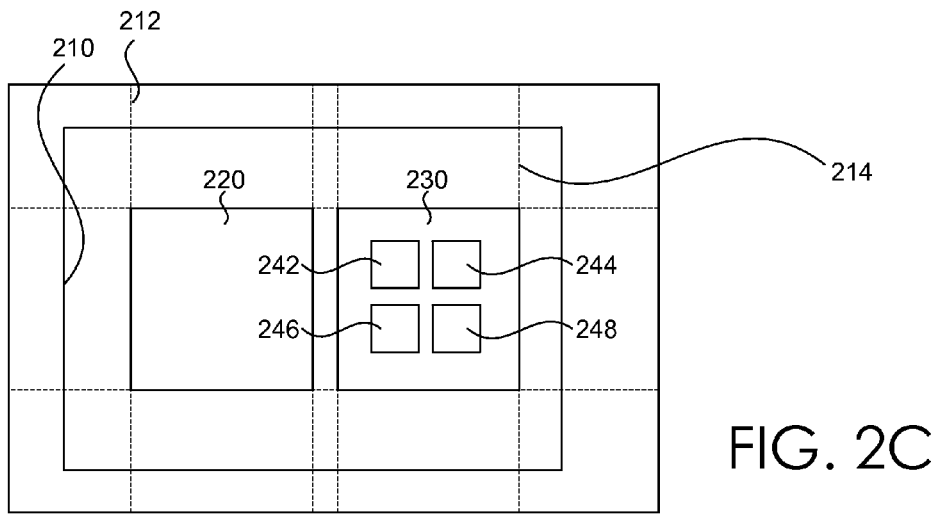
Figure 2D:
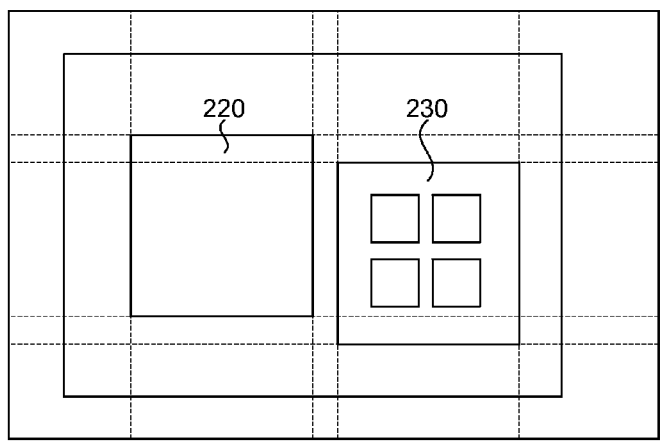
Figure 2E:
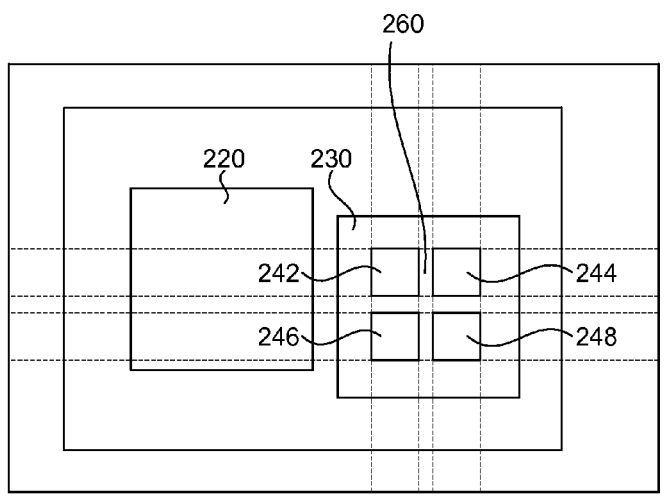
Figure 6:
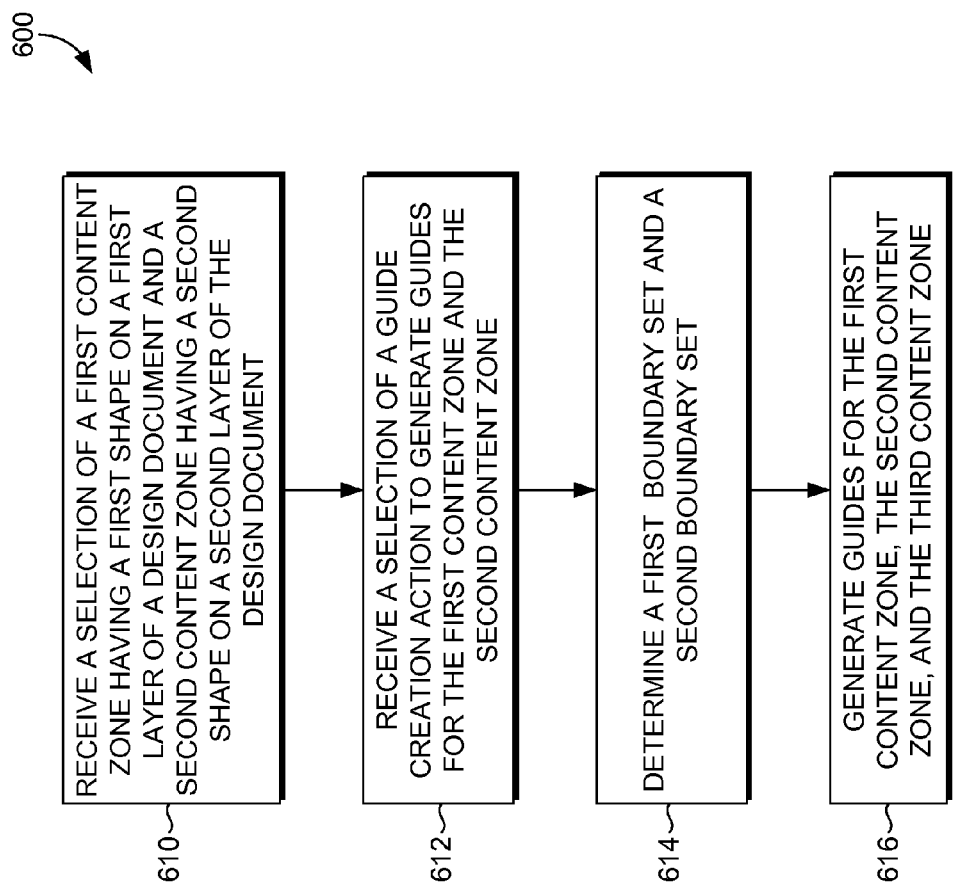
FIG. 6 is a flow diagram showing an exemplary method for automatically generating guides, in accordance with embodiments described herein.

Turning now to FIGS. 2C-2E, exemplary schematics of automatically generated guides for embodiments described herein are provided. In FIG. 2C, 6 content zones are depicted, on a design document canvas 210 with zone 220 on a first layer and zone 230 and zones 242, 244, 246 and 248 on a second layer. Zone 220 and zone 230 include guides based on selecting zone 220 and zone 230 and selecting an interface input to generate guides 212 and 214. Generating guides can be automatically iteratively done on each layer and content zone hierarchy of the design document such that, generating guides further includes determining that at least one guide is bypassed from being generated based on the at least one guide overlapping an existing guide. With reference to FIG. 2D, the content zones 220 and 230 are not aligned on any boundary, as such, there exists no possibility of overlapping guides.

Turning to FIG. 2E, each of the content zones 242, 244, 246, and 248 are selected and content zones 220 and 230 are not selected. Communication of an instruction to automatically generate guides for each of the selected content automatically excludes unselected content zones. As such, the guides are generated only for each of 242, 244, 246, and 248 while excluding 220 and 230. Also, as previously described, the combination of selected content zones automatically generates a new content zone.

Figure 3A:
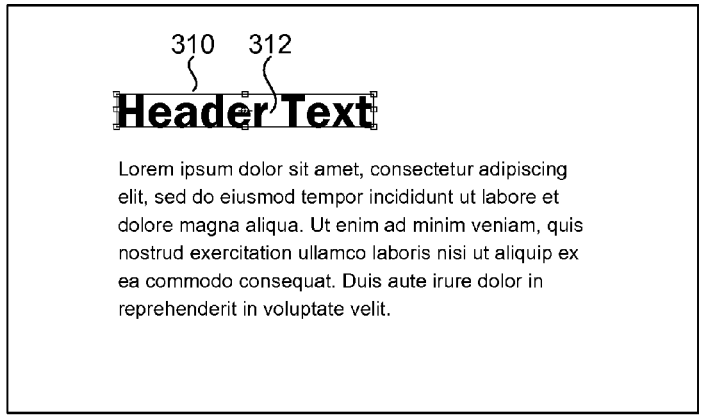
FIGS. 3A-3C are schematics of exemplary automatically generated guides for text content zones, in accordance with embodiments described herein.
Figure 3B:
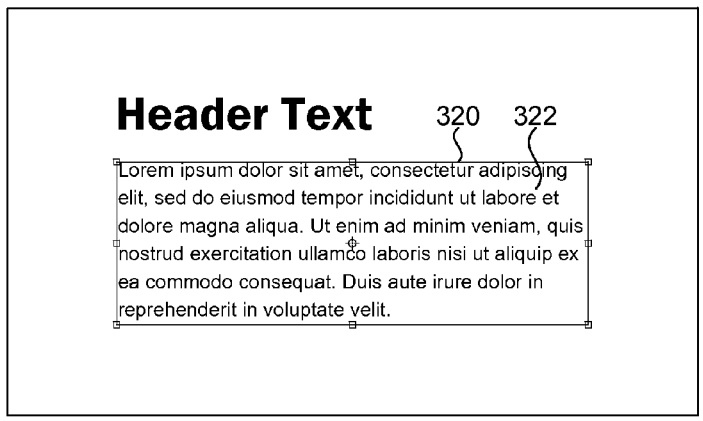
Figure 3C:
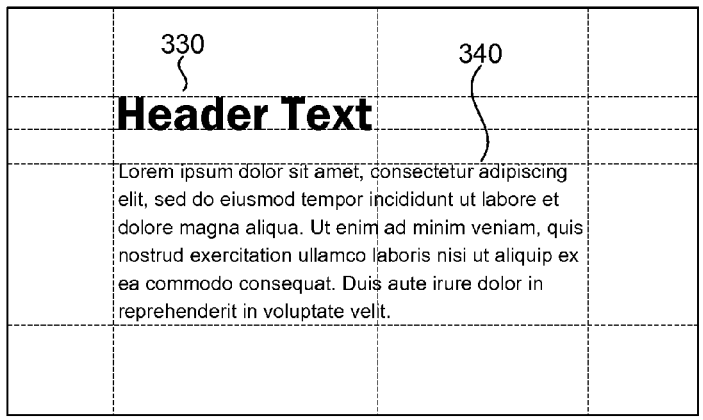

With reference to FIGS. 3A-3C, exemplary schematics of automatically generated guides for embodiments described herein are provided. In particular, guides can be generated for a specific type of content zone. A content zone, in some embodiments, can include point text or paragraph text. FIG. 3A illustrates "Header Text" as point text and FIG. 3B illustrates "Lorem ipsum . . . " as paragraph text. Different text types can include different bounding boxes that define margin attributes (e.g., top, bottom, left and right margins) for text. In this exemplary embodiment, point text does not include a bottom margin while paragraph text includes a bottom margin. In this regard, the shape and by extension a boundary set defined for text content zones can correspond to a bounding box associated with the text content zones. FIG. 3A includes point text 310 and content zone 312 for the point text. FIG. 3B includes paragraph text 320 with content zone 322 for the paragraph text. In FIG. 3C, point text guides are generated, such that, the guides are aligned adjacent a bounding box of the point text, and paragraph text guides are generated such that the guides are aligned to a bounding box of the paragraph text. In this regard, the corresponding bounding boxes of the point text and paragraph text define their respective boundary sets.

Turning now to FIG. 4, a flow diagram is provided that illustrates a method 400 for automatically generating guides. Initially at block 410, a selection of a shape is received. At block 420, a selection of a guide creation action to generate two or more guides for the shape is received. At block 430, a first boundary and a second boundary of the shape are determined. At block 440, a first guide and a second guide for the shape, the first guide is located adjacent to the first boundary and the second guide is located adjacent to the second boundary.

Turning now to FIG. 5, a flow diagram is provided that illustrates a method 500 for automatically generating guides. At block 510, a selection of a content zone having a shape is received. At block 520, a selection of a guide creation action is received to generate a grid structure encompassing the shape of the content zone. At block 530, a boundary set for the shape is determined, the boundary set having a top boundary, a bottom boundary, a left boundary, and a right boundary. At block 540, the grid structure is, without user intervention, generated based on the shape, the grid structure comprises a top horizontal guide, a bottom horizontal guide, a left vertical guide, and a right vertical guide. The grid structure is located adjacent to corresponding portions of the boundary set of the shape.

Turning now to FIG. 6, a flow diagram is provided that illustrates a method 600 for automatically generating guides is provided. Initially at block 610, a selection of a first content zone having a first shape on a first layer of a design document and a second content zone having a second shape on a second layer of the design document is received. At block 620, a selection of a guide creation action to generate guides for the first content zone and the second content zone is received. The guide creation action can be received from a keyboard shortcut or a selectable interface input using an interface of the design document. At block 630, a first boundary set and a second boundary set, are determined. The first boundary set corresponds to the first content zone, the second boundary set corresponds to the second content zone. A boundary set can be determined for a selected shape based on a top portion of the shape, a bottom portion of the shape, a left portion of the shape, and a right portion of the shape, where the selected shape is defined based on vector data.

At block 640, guides are automatically or without user intervention generated for the first content zone and the second content zone. Guides are located adjacent to a boundary from each of the first boundary set, the second boundary set, and third boundary set. The guides are generated on a design document canvas, the guides extend at least to the edge of the design document canvas. Generating guides can be iteratively done on a layer and content zone hierarchy of the design document, such that, for the first content zone and the second content generating guides further includes determining that at least one guide is bypassed from being generated based on the at least one guide overlapping an existing guide.

Figure 7:
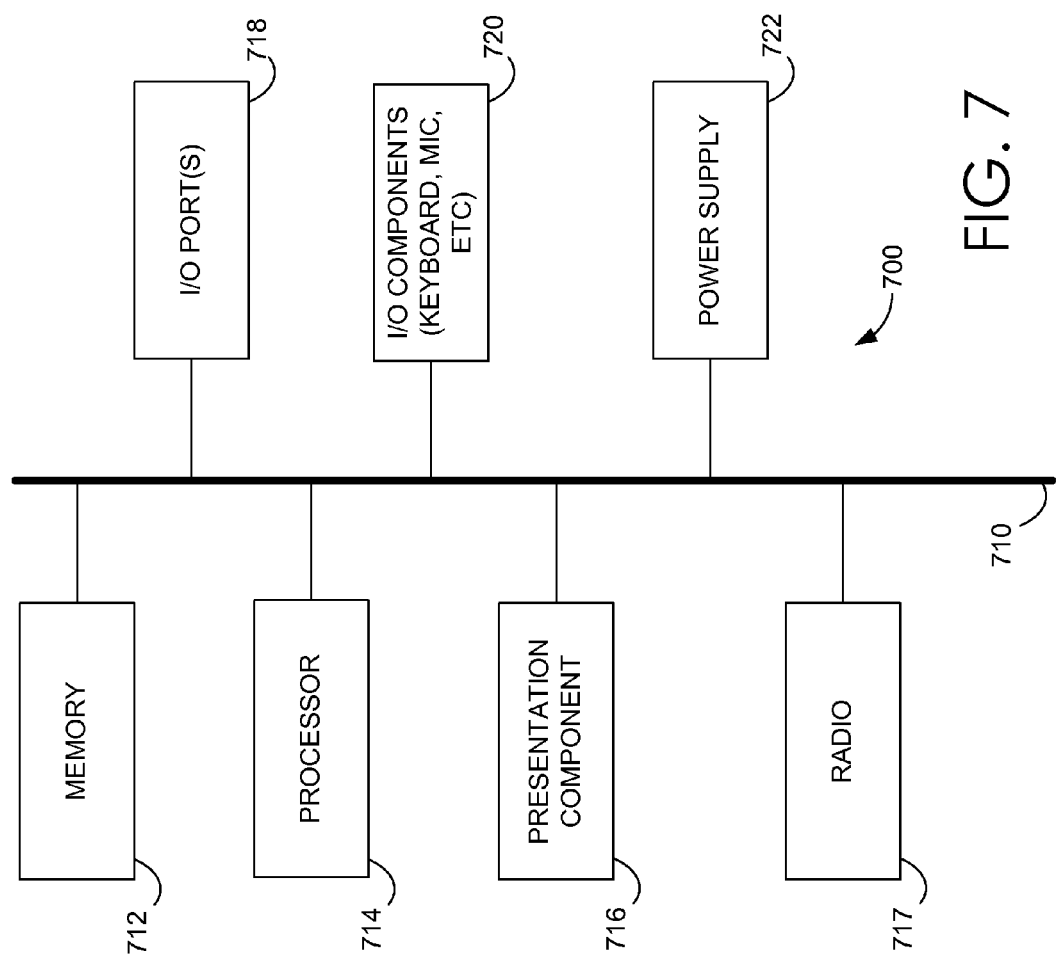
FIG. 7 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Accordingly, in a first embodiment described herein, one or more computer storage media having computer-executable instructions embodied thereon that, when executed, by one or more processors, causes the one or more processors to perform a method for automatically generating guides are provided. The method includes receiving a selection of a shape. The method includes receiving a selection of a guide creation action to generate two or more guides for the shape. The method further includes determining a first boundary and a second boundary of the shape. The method includes automatically generating a first guide and a second guide for the shape, the first guide is located adjacent to the first boundary and the second guide is located adjacent to the second boundary.

In a second embodiment described herein, a computer-implemented method for automatically generating guides is provided. The method includes receiving a selection of a content zone having a shape. The method also includes receiving a selection of a guide creation action to generate a grid structure encompassing the shape of the content zone. The method also includes determining a boundary set for the shape, the boundary set having a top boundary, a bottom boundary, a left boundary, and a right boundary. The grid structure comprises a top horizontal guide, a bottom horizontal guide, a left vertical guide, and a right vertical guide. The method includes, without user intervention, generating the grid structure based on the shape, where the grid structure is located adjacent to corresponding portions of the boundary set of the shape.

In a third embodiment described herein, a system for automatically generating guides on design documents is provided, the system comprising a processor and a memory configured for providing computer program instructions to the processor. The system further comprises a design document component configured for receiving a selection of a first content zone having a first shape on a first layer of a design document and a second content zone having a second shape on a second layer of the design document; receiving a selection of a guide creation action to generate guides for the first content zone and the second content zone; determining a first boundary set and a second boundary set, where the first boundary set corresponds to the first content zone and the second boundary set corresponds to the second content zone; and generating guides for the first content zone and the second content zone, where a guide is located adjacent to a boundary from each of the first boundary set and the second boundary set.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments are described with reference to computing devices and components of a document design system. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects herein above set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, causes the one or more processors to perform a method for automatically generating guides, the method comprising:
   receiving a selection of a first shape and a second shape concurrently displayed on a design document, the selection is based on a selection input, wherein the design document displays a third shape, the third shape is an unselected shape;
   receiving a selection of a guide creation action to generate an initial set of guides for selected shapes;
   based on the selection to generate the initial set of guides, determining a set of boundaries for the first shape and a set of boundaries for the second shape; and
   generating the initial set of guides comprising a first set of guides corresponding to the set of boundaries for the first shape and a second set of guides corresponding to the set of boundaries for the second shape without generating a third set of guides for the third shape, based on the third shape being unselected, wherein each of the guides in the initial set of guides is located adjacent to corresponding boundaries; and
   generating a grid structure based on the first set of guides corresponding to the set of boundaries for the first shape and the second set of guides corresponding to the set of boundaries for the second shape.

2. The media of claim 1, wherein receiving the selection of the first shape and the second shape further comprises:
   receiving a selection of the first shape on a first layer of the design document; and
   receiving a selection of the second shape on a second layer of the design document.

3. The media of claim 1, wherein the set of boundaries for the first shape is determined for at least one of: a top portion of the first shape; a bottom portion of the first shape; a left portion of the first shape; and a right portion of the first shape, wherein the set of boundaries for the second shape is determined for at least one of: a top portion of the second shape; a bottom portion of the second shape; a left portion of the second shape; and a right portion of the second shape.

4. The media of claim 1, wherein generating the first set of guides and the second set of guides further comprises determining that at least one guide is bypassed from generation based on the at least one guide overlapping an existing guide.

5. The media of claim 1, wherein the first set of guides comprises a first guide, a second guide, a third guide, and a fourth guide.

6. The media of claim 1, further comprising:
   placing the first shape in the design document, wherein upon placement, the first set of guides are absent for the first shape; and
   placing the second shape in the design document, wherein upon placemen, the second set of guides are absent for the second shape.

7. The media of claim 1, wherein the shape is based on a content zone comprising at least one of: point text or paragraph text, wherein point text guides are aligned to a bounding box of the point text, and wherein paragraph text guides are aligned to a bounding box of the paragraph text, wherein a bounding box comprises margin attributes that define a boundary set for the point text and paragraph text.

8. The media of claim 1, wherein the shape is defined based on one of: a wireframe layout, or a visual element layout.

9. A computer-implemented method for automatically generating guides, the method comprising:
receiving a selection of a first content zone having a shape displayed on a design document canvas and of a second content zone having a second shape displayed on the design document canvas, the selection based on a selection input, wherein the design document displays one or more other content zones, wherein the other content zones are unselected content zones;
receiving a selection of a guide creation action to generate an initial grid structure encompassing the first shape of the first content zone and the second shape of the second content zone, the initial grid structure comprised of an initial set of guides;
based on the selection to generate the initial grid structure comprised of the initial set of guides, determining initial boundary sets for only the selected content zones, each boundary set having a top boundary, a bottom boundary, a left boundary, and a right boundary and automatically bypassing determining corresponding boundary sets for the one or more other content zones, based on the one or more other content zones being unselected; and
without user intervention, generating the initial set of guides to generate the initial grid structure based on the selected content zones, wherein the initial grid structure is a guide-based layout corresponding to the initial set of guides generated for the selected content zones while excluding from generation initial guides for the one or more unselected content zones, based on the one or more unselected content zones being unselected, wherein the initial set of guides comprise a top horizontal guide, a bottom horizontal guide, a left vertical guide, and a right vertical guide for each of the selected content zones, wherein the initial grid structure is located adjacent to corresponding portions of each of the boundary set of the selected content zones.

10. The method of claim 9, wherein the initial grid structure is generated on the design document canvas, the initial grid structure extending at least to the edge of the design document canvas.

11. The method of claim 9, wherein generating the initial grid structure further comprises:
determining that at least one of: the top horizontal guide, the bottom horizontal guide, the left vertical guide, and the right vertical guide corresponding to the second content zone of the initial grid structure is bypassed from generation based on the top horizontal guide, the bottom horizontal guide, the left vertical guide, or the right vertical guide corresponding to the second content zone overlapping an existing initially generated guide corresponding to the first content zone.

12. The method of claim 9, wherein the first content zone and the second content zone are unaligned in at least one direction such that the corresponding grid structures are generated based on the first content zone and the second content zone being unaligned, wherein the at least one direction is one of: a horizontal direction or a vertical direction.

13. A system for automatically generating guides on design documents, the system comprising:
a processor and a memory configured for providing computer program instructions to the processor;
a design document component configured for:
receiving a selection of a first content zone having a first shape on a first layer of a design document and a second content zone having a second shape on a second layer of the design document;
receiving a selection of a guide creation action to generate guides for the first content zone and the second content zone;
determining a first boundary set and a second boundary set, wherein the first boundary set corresponds to the first content zone, the second boundary set corresponds to the second content zone; and
generating guides for the first content zone and the second content zone, wherein a guide is located adjacent to a boundary from each of the first boundary set and the second boundary set, wherein generating guides for the first content zone and the second content zone further comprises determining that at least one guide is bypassed from generation based on the at least one guide overlapping an existing guide.

14. The system of claim 13, wherein the guides are generated on a design document canvas, the guides extending at least to the edge of the design document canvas.

15. The system of claim 13, wherein the guide creation action is one of: a keyboard shortcut or a selectable interface input using an interface of the design document.

16. The system of claim 13, wherein a boundary set is determined for a selected shape based on a top portion of the selected shape, a bottom portion of the selected shape, a left portion of the selected shape, and a right portion of the selected shape, wherein the selected shape is defined based on a perimeter of data of a corresponding content zone.

17. The system of claim 13, wherein guides generated for text content zones are based on a bounding box of text in the text content zone, wherein the bounding box comprises margin attributes that define a boundary set for the text.

18. The system of claim 13, wherein the selection of the first content zone and the second content zone is received without receiving a selection of the one or more unselected content zones.

19. The system of claim 13, wherein the second content zone comprises an aggregation of the second shape and a third shape such that the second boundary set corresponds with the aggregation of the second shape and the third shape.

20. The system of claim 13, wherein determining that the at least one guide is bypassed from generation further comprises:
generating a set of guides for the first content zone, wherein the set of guides comprise a first guide, a second guide, a third guide, and a fourth guide;
determining that at least one boundary from the second boundary set overlaps with at least one of the set of guides for the first content zone;
based on the overlapping, bypassed from generation the at least one guide that corresponds to the overlapping boundary from the second boundary set and the at least one of the set of guides for the first content zone.

* * * * *

UNITED STATES PATENT AND TRADEMARK OFFICE
CERTIFICATE OF CORRECTION

PATENT NO. : 10,445,407 B2
APPLICATION NO. : 14/804139
DATED : October 15, 2019
INVENTOR(S) : Shaw et al.

Page 1 of 1

It is certified that error appears in the above-identified patent and that said Letters Patent is hereby corrected as shown below:

In the Claims

In Column 12, Line 62, Claim 6, delete "placemen," and insert -- placement, --, therefor.

In Column 14, Line 7, Claim 13, after "shape" insert -- displayed --.

In Column 14, Line 8, Claim 13, after "shape" insert -- displayed --.

In Column 14, Line 9, Claim 13, delete "document;" and insert -- document, the selection is based on a selection input; --, therefor.

Signed and Sealed this
Fifth Day of May, 2020

Andrei Iancu
*Director of the United States Patent and Trademark Office*